United States Patent
Chitsaz et al.

(10) Patent No.: US 9,490,674 B2
(45) Date of Patent: Nov. 8, 2016

(54) ROTATING RECTIFIER ASSEMBLY FOR ELECTRIC MACHINE

(71) Applicant: GE Aviation Systems LLC, Grand Rapids, MI (US)

(72) Inventors: Bijan Chitsaz, Springboro, OH (US); James R. Fox, Huber Heights, OH (US)

(73) Assignee: GE AVIATION SYSTEMS LLC, Grand Rapids, MI (US)

( * ) Notice: Subject to any disclaimer, the term of this patent is extended or adjusted under 35 U.S.C. 154(b) by 320 days.

(21) Appl. No.: 14/138,075

(22) Filed: Dec. 22, 2013

(65) Prior Publication Data

US 2015/0180317 A1    Jun. 25, 2015

(51) Int. Cl.
| | |
|---|---|
| *H02K 11/00* | (2016.01) |
| *H02K 1/32* | (2006.01) |
| *H02K 7/20* | (2006.01) |
| *H02K 9/19* | (2006.01) |
| *H02K 11/04* | (2016.01) |

(52) U.S. Cl.
CPC ........... *H02K 1/32* (2013.01); *H02K 7/20* (2013.01); *H02K 9/19* (2013.01); *H02K 11/042* (2013.01)

(58) Field of Classification Search
CPC . H02K 11/042; H02K 11/044; H02K 11/046
See application file for complete search history.

(56) References Cited

U.S. PATENT DOCUMENTS

| | | | | |
|---|---|---|---|---|
| 2,897,383 | A | * | 7/1959 | Braun ................ H02K 11/042 310/68 D |
| 3,348,127 | A | | 10/1967 | Petersen |
| 3,573,569 | A | * | 4/1971 | Davis .................... H01L 23/427 257/686 |
| 4,628,219 | A | * | 12/1986 | Troscinski ............ H01L 25/074 257/658 |
| 4,745,315 | A | * | 5/1988 | Terry, Jr. .............. H02K 11/042 257/658 |
| 4,806,814 | A | * | 2/1989 | Nold .................... H02K 11/042 310/168 |
| 4,896,062 | A | * | 1/1990 | Pollard ................. H01L 25/117 257/719 |
| 5,001,376 | A | | 3/1991 | Iseman |
| 5,414,318 | A | | 5/1995 | Shimizu et al. |
| 5,796,196 | A | * | 8/1998 | Johnsen ............... H01L 25/112 257/E25.025 |
| 6,903,470 | B2 | | 6/2005 | Doherty et al. |
| 7,166,943 | B2 | | 1/2007 | Johnsen |
| 7,944,100 | B2 | | 5/2011 | Lemmers, Jr. et al. |
| 2003/0164651 | A1 | | 9/2003 | Tornquist et al. |
| 2010/0019628 | A1 | | 1/2010 | Kitzmiller et al. |
| 2010/0283357 | A1 | | 11/2010 | Lemmers, Jr. et al. |
| 2011/0296672 | A1 | | 12/2011 | Ganong et al. |

FOREIGN PATENT DOCUMENTS

| | | |
|---|---|---|
| EP | 1788693 B1 | 9/2009 |
| GB | 1183291 A | 2/1968 |
| GB | 1507755 A | 4/1978 |
| GB | 2015252 A | 9/1979 |
| WO | 9013144 A1 | 11/1990 |

OTHER PUBLICATIONS

GB Combined Search and Examination Report issued in connection with corresponding Application No. GB1403209.8 on Augus.
Written Opinion for PCT/US2013/043814 dated Mar. 4, 2014.

\* cited by examiner

*Primary Examiner* — Burton Mullins
(74) *Attorney, Agent, or Firm* — GE Global Patent Operation; William S. Munnerlyn

(57) ABSTRACT

An electric machine having a rectifier assembly placed within a rotating shaft of the electric machine to convert the AC output of the electric machine to the DC input prior to transmission of the electricity from the electric machine.

11 Claims, 4 Drawing Sheets

ROTATING RECTIFIER ASSEMBLY FOR ELECTRIC MACHINE

BACKGROUND OF THE INVENTION

Electric machines, such as electric motors and/or electric generators, may be used in the generation of electricity. In the aircraft industry, it is common to find combination motors/generators, where the motor is used to power the generator, and, depending on the configuration, functions as a generator, too. Regardless of the configuration, generators typically include a generator rotor having main windings that are driven to rotate by a source of rotation, such as an electrical or mechanical machine, which for some aircraft may be a gas turbine engine. In some applications, the generators initially generate alternating current (AC), which is rectified to generate direct current (DC) for DC components on the aircraft.

BRIEF DESCRIPTION OF THE INVENTION

A rectifier assembly for placement within a rotating shaft of an electric machine assembly having a first machine providing an alternating current output and a second machine receiving a direct current input, with the rectifier assembly converting the alternating current output to the direct current input, the rectifier assembly includes a conductive frame having a least two elongated side elements defining an interior and having axially spaced and axially facing conductive diode seats coupled to the side elements, a set of axially spaced diodes supported by the diode seats and having an input electrically coupled with the alternating current output and an output electrically coupled with the conductive frame, and an output bus bar electrically coupling the conductive frame to the direct current input of the second machine.

DESCRIPTION OF EMBODIMENTS OF THE INVENTION

Embodiments of the invention may be implemented in any environment using an electric motor regardless of whether the electric motor provides a driving force and/or generates electricity. For purposes of this description, such an electric motor will be generally referred to as an electric machine, electric machine assembly, or similar language, which is meant to make clear that one or more stator/rotor combinations may be included in the machine. While this description is primarily directed toward an electric machine providing power generation, it is also applicable to an electric machine providing a driving force and/or an electric machine providing both a driving force and power generation. Further, while this description is primarily directed toward an aircraft environment, embodiments of the invention are applicable in any environment using an electric machine.

Figure 1:
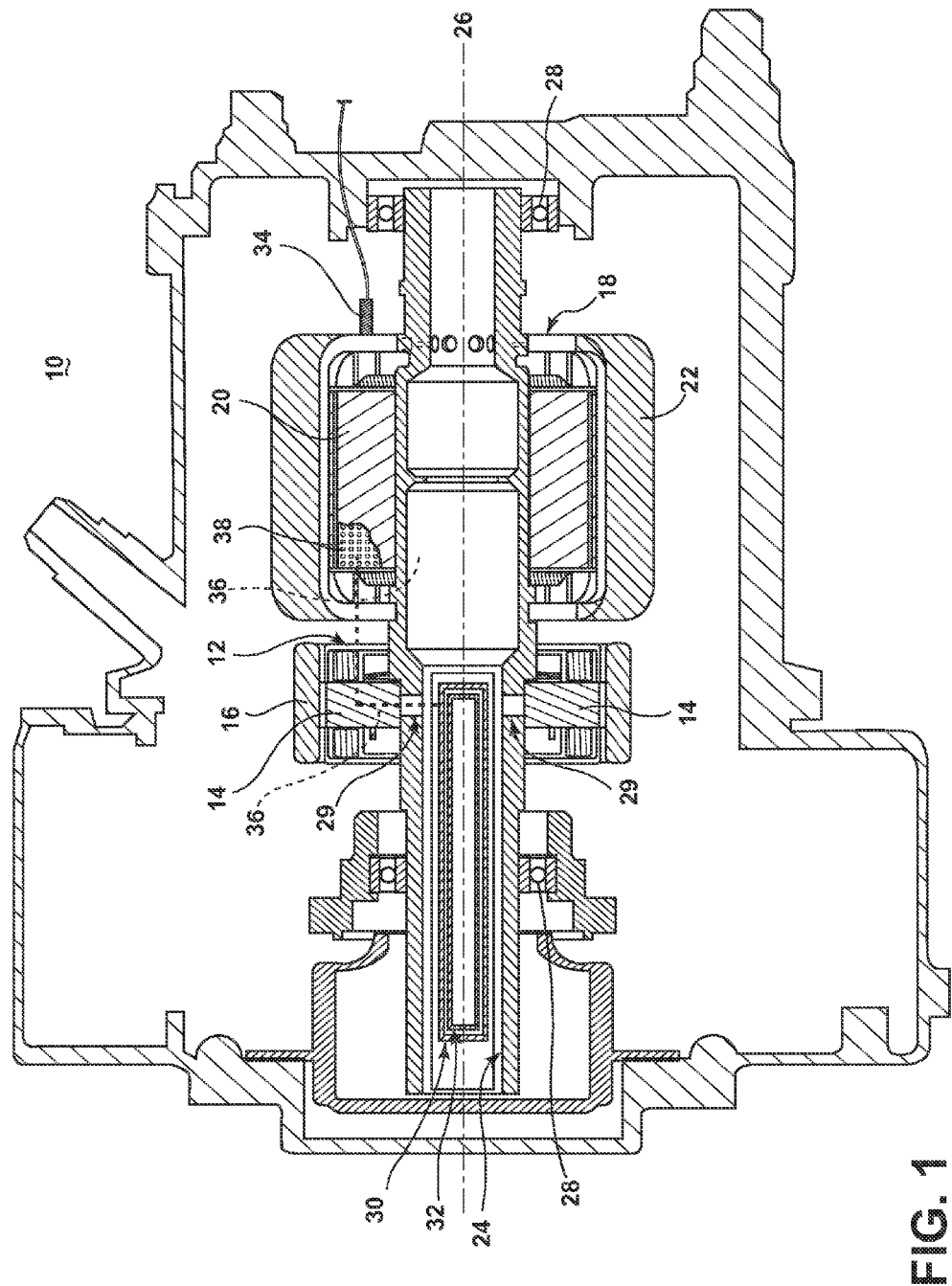
FIG. 1 is a cross-sectional view of an electrical machine assembly.

Turning to an exemplary embodiment of the invention, FIG. 1 schematically illustrates an electrical machine assembly 10 comprising a first machine 12 having an exciter rotor 14 and an exciter stator 16, and a second machine 18 having a main machine rotor 20 and a main machine stator 22. At least one power connection is provided on the exterior of the electrical machine assembly 10 to provide for the transfer of electrical power to and from the electrical machine assembly 10. Power is transmitted by this power connection, shown as an electrical power cable 34, to the electrical load and may provide for a three phase with a ground reference output from the electrical machine assembly 10.

The electrical machine assembly 10 further comprises a rotatable shaft 24 mechanically coupled to a source of axial rotation, which may be a gas turbine engine (not shown), about a common axis 26. The rotatable shaft 24 is supported by spaced bearings 28 and includes access openings 29 radially spaced about the shaft 24. The exciter rotor 14 and main machine rotor 20 are mounted to the rotatable shaft 24 for rotation relative to the stators 16, 22, which are rotationally fixed within the electrical machine assembly 10. The stators 16, 22 may be mounted to any suitable part of a housing portion of the electrical machine assembly 10.

The rotatable shaft 24 further comprises at least a hollow portion for enclosing a shaft tube 30, which is contemplated to be non-conducting. The shaft tube 30 is rotationally coupled for co-rotating with the rotatable shaft 24 and further houses a rectifier assembly 32, insulating the rectifier assembly 32 from the rotatable shaft 24. It is envisioned that the rotatable shaft may comprise any suitable non-conductive material.

The exciter rotor 14 is electrically connected to the rectifier assembly 32 by way of conductors 36 (schematically shown as dotted lines). Additionally, the rectifier assembly 32 is electrically connected to the main windings 38 of the main machine rotor 20 by way of conductors 36.

Figure 2:
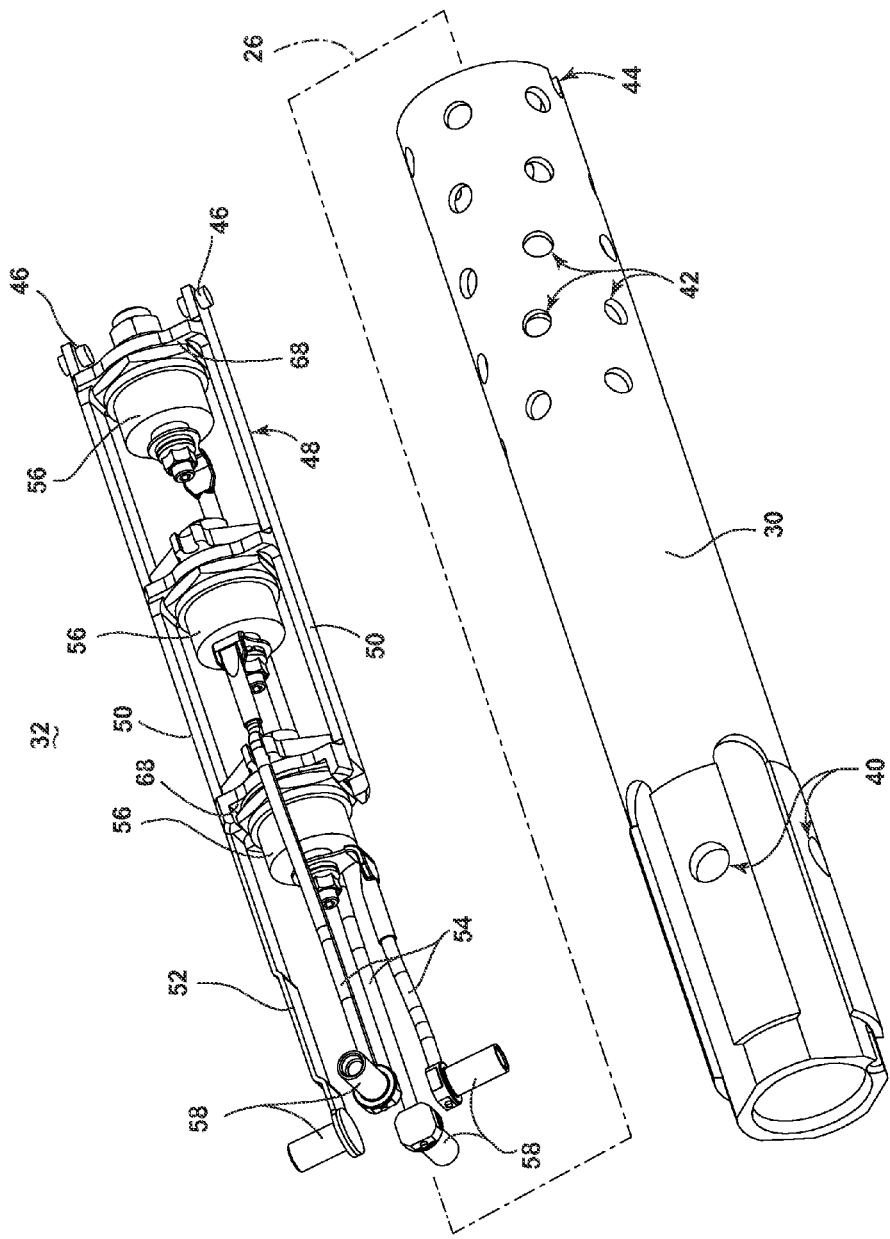
FIG. 2 is a perspective view of the rectifier assembly and the shaft tube.

Turning now to FIG. 2, the details of the shaft tube 30 and the rectifier assembly 32 will be described. The shaft tube 30 has a substantially cylindrical structure with opposing open ends, and includes four mounting connector openings 40 spaced radially near an end of the shaft tube 30. The shaft tube 30 is also shown having optional access openings 42, some of which may be radially aligned for accessing portions of the rectifier assembly 32. The shaft tube 30 is shown further comprising optional keyed recesses, or anchor fastener openings 44, at the axial end of the shaft tube 30, opposite of the mounting connector openings 40.

The rectifier assembly 32 comprises an axially extending conductive frame, shown as a ladder structure 48, having at least two elongated side elements 50 electrically coupled to each other via at least one conductive diode seat 68. The rectifier assembly 32 also includes a plurality of conductive bus bars 52, 54 shown radially spaced about the rectifier assembly 32 axis, illustrated as a single conductive DC bus bar 52 and three conductive, yet flexible, AC bus bars 54. The ladder structure 48 further comprises a set of axially spaced, forward-biased diodes 56 electrically coupling at least one of the AC bus bars 54 to the ladder structure 48. The ladder structure 48 is further electrically coupled to the DC bus bar 52. The ladder structure 48 may be made of any suitable conductive material, for example, aluminum.

Each bus bar 52, 54 comprises a first end having terminal connectors 58 for securing the respective DC and AC bus bars 54, 52 to the respective first and second machines 12, 18 by way of conductors 36. The AC bus bars 54 receive the input AC voltage from the first machine and the DC bus bars 52 deliver the output DC voltage from the rectifier assembly 32. As illustrated, the terminal connectors 58 may be integrally formed and/or conjoined with the first end of the bus bars 54, 52. Alternatively, a fastener, such as a screw may be provided to aid in the mounting of the terminal connectors 58 to the first end of the bus bars 54, 52. Alternatively, non-mechanical fasteners, such as welding or adhesive may also be used. Additionally, while the AC bus bars 54 are described as flexible, it is envisioned that the DC and AC bus bars 52, 54 may comprise any combination of flexible and/or inflexible conductive materials.

The assembled components 48, 52, 54, 56 collectively define an axially extending, annular rectifier structure defining an axially extending interior. Alternate placement and configuration of the components 48, 52, 54, 56 are envisioned.

The ladder structure 48 may also optionally comprise assembly anchors, shown as protrusions 46, which may be keyed to interact with the corresponding anchor fastener openings 44 of the shaft tube 30. The protrusions 46 and anchor fastener openings 44 are configured such that when the rectifier assembly 32 is inserted within the shaft tube 30, the protrusions 46 are radial keyed to be axially received within the fastener openings 44. Additionally, the terminal connectors 58 and mounting connector openings 40 are configured such that, when the shaft tube 30 and the rectifier assembly 32 are assembled and keyed based on the corresponding protrusions 46 and fastener openings 44, the connectors 58 are received by the openings 40 to provide for electrical coupling between the AC connectors 58 and the first machine 12, and the DC connectors 58 and the second machine 18.

Figure 3:
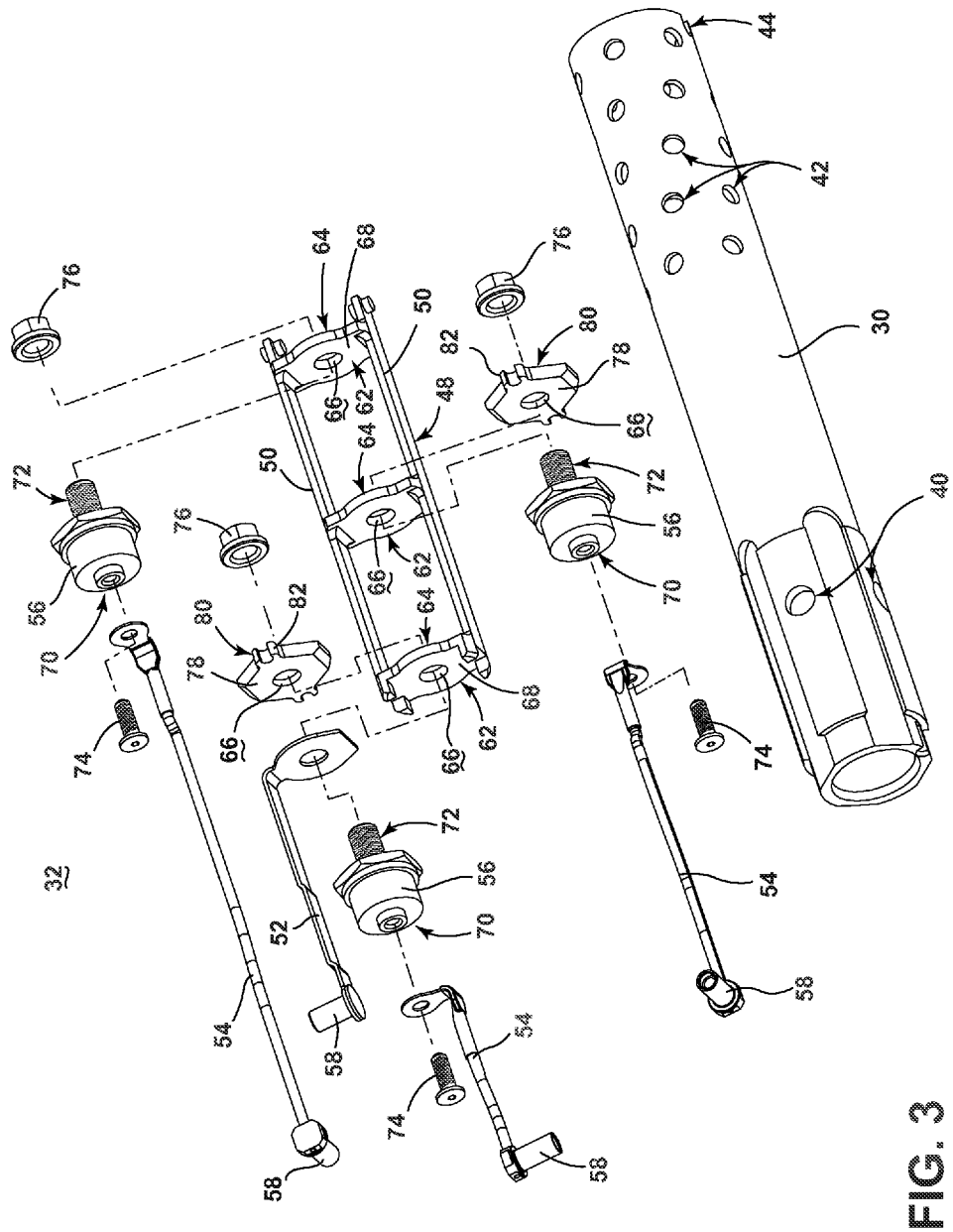
FIG. 3 is an axially exploded view of the rectifier assembly and the shaft tube.

FIG. 3 illustrates an exploded perspective view of the rectifier assembly. As illustrated, the ladder structure 48 further comprises axially spaced and axially facing conductive diode seats 68 electrically coupling the side elements 50, wherein each seat 68 further comprises axially opposing first and second segment faces 62, 64, and an opening 66 that may extend through the seat 68. In one example, the first segment face 62 of each seat 68 may operate and or be configured for receiving the diode 56.

Each diode 56 may additionally comprise an anode terminal 70 and a cathode terminal 72, configured in the direction of the diode 56 bias, wherein each terminal 70, 72 may be configurably coupled with any conductive surface coupling or suitable conductive mechanical or non-mechanical fasteners. In the illustrated example, the diodes 56 are shown having an anode terminal 70 configured to receive a mechanical fastener, such as a threaded screw 74, and a cathode terminal 70 configured to include a threaded screw 74 receivable by a screw base 76.

The rectifier assembly 32 may additionally comprise at least one non-conductive isolating segment 78 having at least one radially spaced guide channel, such as mounting connector 80, and configured to be placed adjacent to a second segment face 64 of a diode seat 68. In this sense, the isolating segment 78 may be supported by the diode seat 68, opposite of the diode 56. The mounting connector 80 may further be defined by restraining elements, shown as semicircular restraining arms 82, configured such that the AC bus bars 54 extending axially along the isolating segment 78 may be receivably mounted by the mounting connector 80. It is envisioned that the mounting connectors 80 may provide a suitable mounting coupling with the AC bus bars 54 wherein the mounting prevents damage to the bus bars 54, for instance, from vibrations or slight movements of the bus bars 54 relative to the mounting connector 80. In the example shown, the isolating segment 78 may further include an opening 66, similar in size, shape, and placement, to the opening of a correspondingly adjacent diode seat 68.

When assembled, each AC bus bar 54 may be electrically coupled with an anode terminal 70 of a diode 56 by, for example a threaded screw 74. The diode 56 is further electrically coupled, via the cathode terminal 72, to a first segment face 62 of a diode seat 68. In the example illustrated, the threaded extension of the cathode terminal 72 may be received through the opening 66 of the diode seat 68, and further received through the opening 66 of the isolating segment 78, wherein the threaded extension of the cathode terminal 72 may be, for instance, compressively fixed by a screw base 76. As shown, the assembling of the AC bus bar 54 and diode 56 closest to the bus bar 52, 54 end of the ladder structure 48 may also include an electrical coupling of the cathode terminal 72 of the diode 56 to the DC bus bar 52 in addition to the electrical coupling of the terminal 72 to the ladder structure 48, for instance, by receiving the threaded extension of the terminal 72 through a corresponding opening 66 of the DC bus bar 52. In this instance, the ladder structure 48 and/or diode seat 68 may be keyed to mount the DC bus bar 52 in a certain configuration. Alternatively, the DC bus bar 52 may be electrically coupled to the ladder structure 48 at another mounting point. Alternative fixing methods and/or devices for assembling the above mentioned components are envisioned.

When assembled, the AC bus bars 54 extending axially along the rectifier assembly 32 to diodes 56 may be electrically isolated from the ladder structure 48 and/or other diodes 56 by the mounting connectors 80 of the isolating segments 78. While substantially circular diodes 56, diode seats 68, and isolating segments 78 are illustrated, alternative shapes are envisioned. For example, circular or alternative shapes may include grooves or additional openings to allow for coolant and/or oil to transverse through the interior of, or about, the rectifier assembly 32.

The rectifier assembly 32 may then be axially inserted into the shaft tube 30 such that the keyed alignment of the anchor fastener openings and protrusions also aligns the terminal connectors 58 of each bus bar 52, 54 with the respective mounting connector openings 40. The rectifier assembly 32 is further axially secured to the shaft tube 30 when the terminal connectors 58 are secured to the first and second machines 12, 18 through the mounting connector openings 40.

Additionally, as shown, the three AC bus bars 54 receive the respective three-phase AC output of the exciter rotor 14. Furthermore, the DC bus bar 52 is used for the transmission of the DC output to the second machine 18. Alternate arrangements and quantities of AC and DC bus bars 54, 52 are envisioned based on the needs and configuration of the electrical machine assembly 10.

Figure 4:
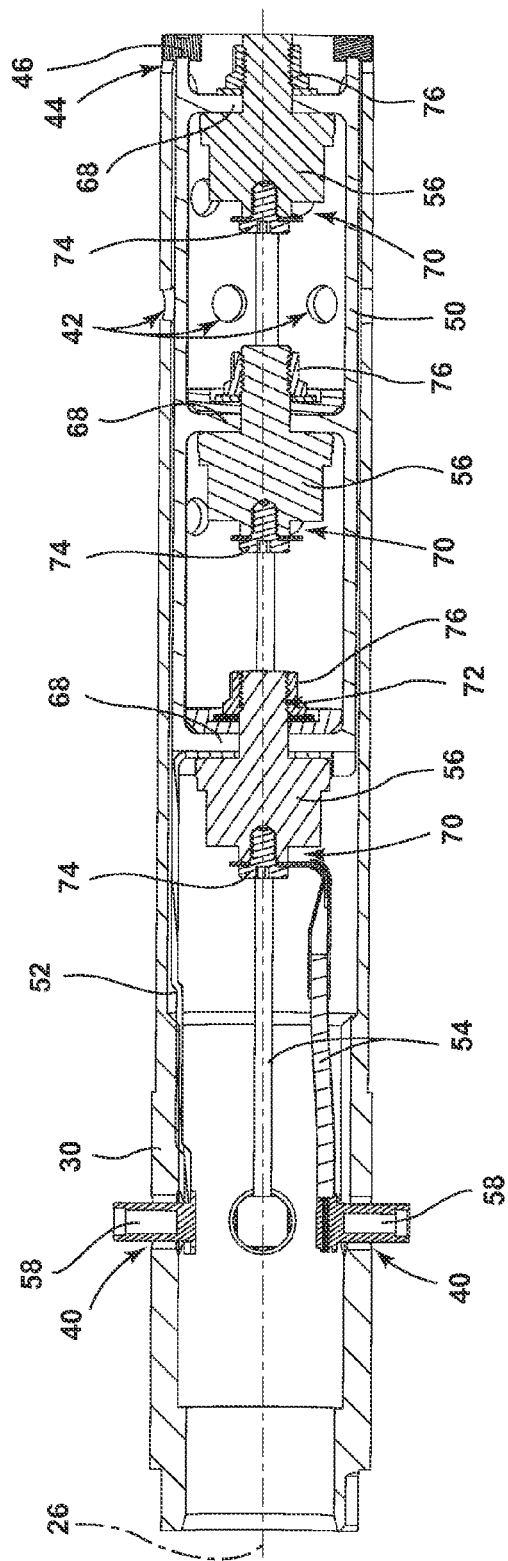
FIG. 4 is a cross-sectional view of the assembled rectifier assembly and the shaft tube.

FIG. 4 illustrates a cross-sectional view of the assembled rectifier assembly 32 coupled with the shaft tube 30. When fully assembled, it is envisioned that the rectifier assembly 32 is rotationally balanced, and thus allows for high speed rotation about the common axis 26.

During generator operation, the rotatable shaft 24 is driven by the source of axial rotation. The rotation of the mounted exciter rotor 14, adjacent to the exciter stator 16, generates a three-phase AC current, which is delivered to three respective AC input bus bars 54 by the conductors 36 and terminal connectors 58. Each phase of the AC current is transmitted from the bus bar 54 to one diode 56. The diodes 56 are configured in a half bridge configuration and operate to provide rectification of the AC current to the DC current. The DC current from each diode 56 is transmitted through the ladder structure 48 to the DC bus bar 52, where the DC current is further transmitted by the terminal connectors 58 and conductors 36 into the main windings 38 of the main machine rotor 20. The rotation of the main machine rotor 20 about the main machine stator 22 generates the electricity that is used to power the generator load.

In the instance where the rectifier assembly 32 is configured to allow coolant to traverse the interior of the rectifier assembly 32, the coolant may operate to cool any transient or steady-state temperature conditions that develop at the ladder structure 48, the diodes 56, and/or any of the bus bars 54, 52. Alternatively, the ladder structure 48 may be configured to receive heat generated by the operation of the diodes 56, and the coolant may dissipate heat from the ladder structure 48. Alternate coolant configurations are envisioned.

Many other possible embodiments and configurations in addition to that shown in the above figures are contemplated by the present disclosure. For example, one embodiment of the invention contemplates alternate configurations of forward or reverse-biased diode that may provide for full wave or half wave rectification. Another example of the invention contemplates using a self-contained oil system for cooling, or air for cooling. In yet another embodiment of the invention, the shaft tube 30 may be made from either a conductive or non-conductive material to achieve further cost reduction. Furthermore, a different example of the invention may forgo the shaft tube 30 altogether and provide for the rectifier assembly to be received directly into the rotatable shaft. Moreover, the design and placement of the various components may be rearranged such that a number of different in-line configurations could be realized.

One advantage that may be realized in the above embodiments is that the above described embodiments have superior weight and size advantages over the conventional type generator rectification systems. With the proposed rotating arrangement, current rectification can be achieved without the external space constraints of additional circuitry. Additionally, the construction and assembly of the rectifier will result in reduced maintenance downtime. Yet another advantage of the above embodiments is that the oil or coolant already present in the rotating shaft may be used to maintain the rectifier assembly, saving additional weight and size of a separate component. A further advantage of the above embodiments is that it reduces the risks of the diode electrically shorting to a metallic shaft. Moreover, due to the rotational balance of the rectifier assembly, a high peripheral speed can be achieved due to the reduced centrifugal forces of moving the assembly closer to the common axis of rotation. The higher peripheral speed results in a lower generator electromagnetic weight.

When designing aircraft components, important factors to address are size, weight, and reliability. The above described rectifier assembly has a decreased number of parts as the system will be able to provide rectified DC outputs with minimal power conversion equipment, making the complete system inherently more reliable. This results in a lower weight, smaller sized, increased performance, and increased reliability system. The lower number of parts and reduced maintenance will lead to a lower product costs and lower operating costs. Reduced weight and size correlate to competitive advantages during flight.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A rectifier assembly for placement within a rotating shaft of an electric machine assembly having a first machine providing an alternating current output and a second machine receiving a direct current input, with the rectifier assembly converting the alternating current output to the direct current input, the rectifier assembly comprising:
   a conductive frame having a least two elongated side elements defining an interior and having axially spaced and axially facing conductive diode seats coupled to the side elements;
   a set of axially spaced diodes supported by the diode seats and having an input electrically coupled with the alternating current output and an output electrically coupled with the conductive frame;
   at least one non-conductive segment supported by the at least one diode seat, wherein the non-conductive segment is opposite of the diode and has radially arranged mounting connectors; and
   an output bus bar electrically coupling the conductive frame to the direct current input of the second machine.

2. The rectifier assembly of claim 1 wherein the diodes are configured in a half bridge configuration.

3. The rectifier assembly of claim 1 further comprising an input bus bar for each of the at least one diode seats.

4. The rectifier assembly of claim 3 wherein the input bus bar is electrically isolated from the conductive frame by the non-conductive segment.

5. The rectifier assembly of claim 4 wherein at least a portion of the input bus bar is mounted to at least one of the mounting connectors of the non-conductive segment.

6. The rectifier assembly of claim 1 wherein the mounting connectors are wire guides.

7. The rectifier assembly of claim 1 wherein the output bus bar is mounted to an end of the conductive frame.

8. The rectifier assembly of claim 1 wherein the interior of the rectifier assembly defines a passage for coolant to traverse.

9. The rectifier assembly of claim 1 wherein the conductive frame dissipates heat generated by the diode.

10. The rectifier assembly of claim 1 wherein the rectifier assembly is rotationally balanced.

11. The rectifier assembly of claim 1 further comprising an input bus bar for each of the at least one diode seats and the at least one non-conductive segment supported by the at least one diode seat;
   wherein the input bus bar is electrically isolated from the conductive frame by the non-conductive segment;
   wherein at least a portion of the input bus bar is mounted to the at least one non-conductive segment; and
   wherein the output bus bar is mounted to an end of the conductive frame.

* * * * *